March 3, 1964   C. L. EMERY ETAL   3,122,918
LOAD GAUGES
Filed May 9, 1961
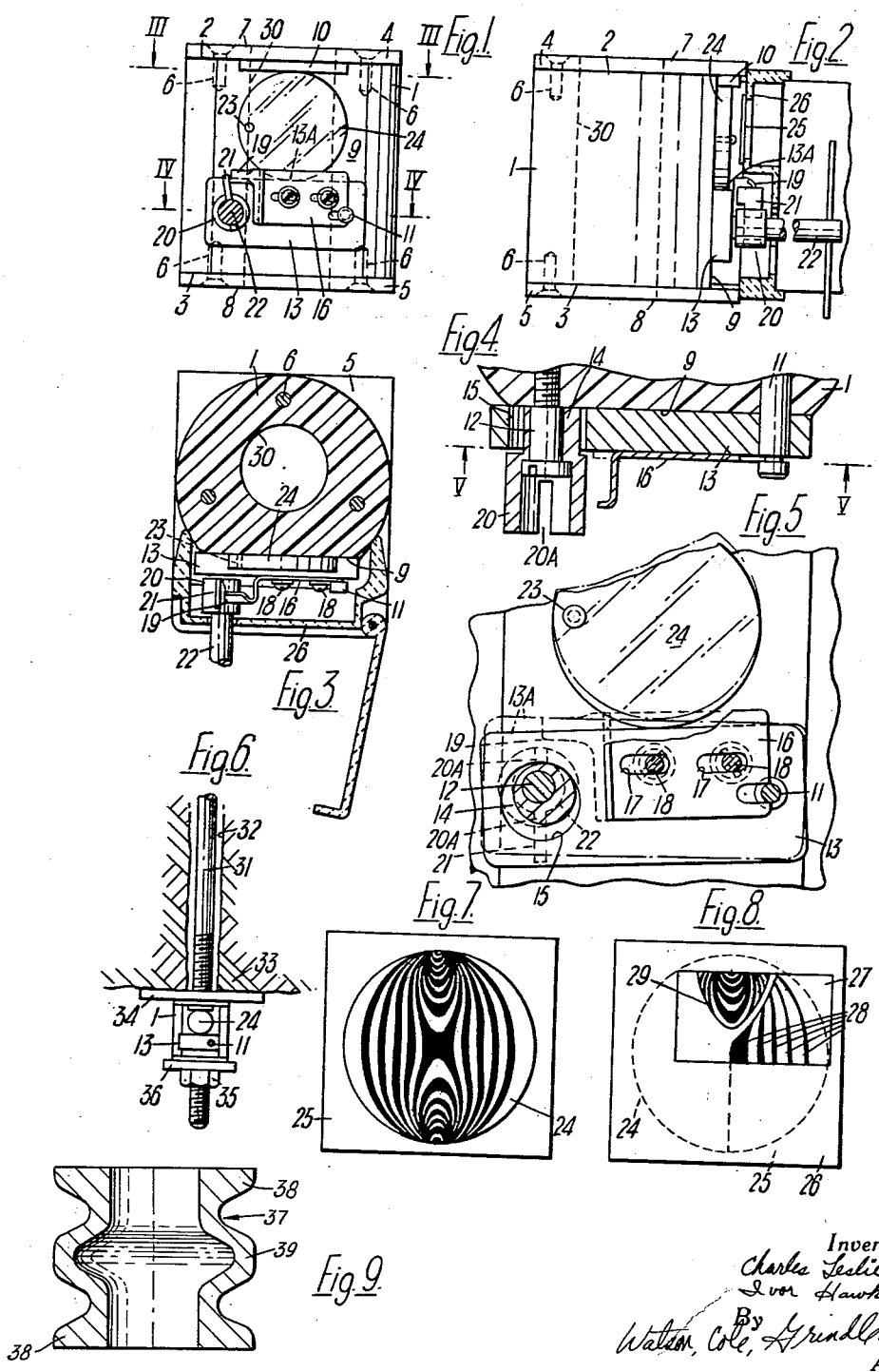

3,122,918
LOAD GAUGES
Charles L. Emery, 59 Gibson St., Kingston, Ontario, Canada, and Ivor Hawkes, 25 Wyatt Ave., Sheffield, England
Filed May 9, 1961, Ser. No. 108,916
Claims priority, application Great Britain May 17, 1960
7 Claims. (Cl. 73—141)

This invention relates to load-measuring gauges, extensometers, and the like. Gauges and other instruments for measuring loads and changes of length under load usually call for precise machining of components parts and/or the use of complicated electric circuits.

It is known to use birefringent or "photoelastic" materials (well-known examples of which are acrylic resins, epoxy resins, ethoxylene resins, and glyptal resins) for the investigation of strain distribution of a part under load, either by making a model that reproduces the geometry of a part to be investigated and can be loaded in simulation of the actual loads encountered by such shape, or by applying a thin coating to the surface of a part to be investigated, which coating then re-acts much as the model just mentioned. In each case, the applied load sets up a strain pattern in the birefringent material, which can be observed in a polariscope or directly by covering the model or coating with a layer of polarising material with or without a suitable quarter-wave plate in accordance with the nature of fringe pattern desired, the pattern giving the difference in principal strains (shears) or the principal strain directions in the model or part under investigation. In neither of these existing techniques is there any measurement of total load or total deformation.

The present invention utilises the uniform elasticity of birefringent materials, and the consequent proportional strain under applied loads, to induce geometric fringe patterns in the material through the medium of other materials and mechanisms interposed between the part to be investigated and the birefringent material, in such a manner that the material can be used to indicate directly load or change of dimension.

According to the present invention, a load gauge comprises a holder adapted to be applied to a part the load on which or the change of dimension of which is to be investigated, so as itself to be subjected to such load or change of dimension, with provision in the holder to receive a plate of birefringent material and to convey to that plate, in the general plane of the plate, a strain in dependence upon that undergone itself.

With the holder so proportioned and designed that its material remains within its own elastic range under the load arising in the conditions to be investigated, the resultant distortion of the plate sets up a fringe pattern from which the load or the change of dimension can be determined. The use of a reflective surface behind the transparent or translucent plate enables the fringe pattern to be viewed in a polariscope. The pattern, after calibration, gives a direct indication of the load or movement. However, as will be explained below, the desired measurement can even be made without the need for calibration in some circumstances.

Advantageously, the plate of birefringent material is a circular disc, located in the holder so that the load is applied at ends of a diameter, when the very convenient result is obtained of a fringe order at the center of the disc that is directly proportional to the strain applied across a diameter. A similar result is obtained with an elliptical plate, loaded at the ends of one of its axes.

A load gauge according to the invention may be used to measure either tensile or compressive loads. Thus, the same basic holder may be used, whether the applied load is tensile or compressive, in the form of a body of material with parallel end faces by which compressive load may be applied to the body to cause it to undergo elastic strain, with a recess located at a side of the body into which may be placed a plate of birefringent material overhung at opposite ends by overhanging ends of the recess parallel to the end faces. Under compressive load, the body is compressed and load is applied to the opposite ends of the plate by contraction of the edges of the recess, so that a characteristic fringe pattern is set up in the plate. By adjusting the initial clearance between the plate and the edges, the pattern can be initiated at any predetermined load; and, with appropriate Young's modulus of the material of the body, cross-sectional area and/or other shape characteristic of the body, and size of plate, preferably of the circular or elliptical form already indicated, a known linear relationship may be set up between the fringe order at the centre of the plate and any given load. By using a compensating polariscope, fractions of fringes at the centre can be measured, and thus the load can be measured to a degree of exactness dependent only on the degree of resolution of the polariscope. However, as explained below, provision may be made for unaided visual observation of the fringe pattern.

The body may be put in compression by a member that is under a tension desired to be measured. Thus, the body may be a solid block with a hole from end to end to enable it to be used as a washer on a bolt or the like, so that the reading of compressive load on the block (with allowance for the reduction of cross-section represented by the bolt) gives the tensile load on the bolt or the like.

Such solid block may take many different forms for example, a cylinder, a cube or prism, or a sphere. A cylindrical block has the advantage of simplicity of form, and is very convenient in the application of the gauge as a load cell, to receive direct compression, or, with a hole from end to end, for use as a dynamometer for measuring the tension in a bolt or the like as indicated above. The Young's modulus of the material of the solid block should be such that, in conjunction with the cross-sectional area, the strain occurring over the load range under investigation is of a magnitude such that the transmission of that strain to the particular plate used with the block sets up fringe patterns that are readily capable of interpretation in degrees of strain. Thus, a material with relative low Young's modulus, such as nylon, is suitable.

The body may however be formed of material of high Young's modulus, such as high-tensile steel, so shaped as to undergo a strain over the load range under investigation appropriate to the particular plate used with the body. Thus, a body in the form of a stiff tubular bellows having parallel end faces may be used, e.g., a tube with end flanges that merge externally into the outer surface of a circumferential swelling normal to the axis of the tube, with the bore of the tube enlarging within the swelling to produce a substantailly uniform wall thickness throughout the swelling.

An embodiment of the invention will now be described with reference to the accompanying drawings, in which FIGURE 1 is a front elevation of a load gauge capable of measuring tensile and compressive loads, with a cover removed;

FIGURE 2 is a side elevation of FIGURE 1;

FIGURE 3 is a section taken on the line III—III of FIGURE 1;

FIGURE 4 is a fragmentary section, to a larger scale, on the line IV—IV of FIGURE 1;

FIGURE 5 is a front view taken on the line V—V of FIGURE 4;

FIGURE 6 is a part-sectional view showing the application of the gauge of FIGURES 1 to 3 to a rock bolt;

FIGURE 7 shows the type of fringe pattern obtainable with the gauge;

FIGURE 8 is a front elevation of a mask that may be used with the gauge; and

FIGURE 9 is a vertical section of a tubular bellows for alternative use with a gauge as in FIGURES 1 to 5.

In FIGURES 1 to 5, a cylindrical block 1 of nylon in which molybdenum disulphide has been compounded has parallel end faces 2, 3 to which are secured metal plates 4, 5 by screws 6. The outer faces 7, 8 of the plates 4, 5 are parallel to the end faces 2, 3. Along one side of the block 1 is formed a flat face 9, perpendicular to the end faces 2, 3. This is overhung at the top by a metal strip 10 secured to the plate 4. Near the bottom of the face 9, a peg 11 and a screw 12 provide respectively a pivot near one end of a metal lever strip 13 and a pivot for an eccentric 14 bearing on the top of a hole 15 in the lever strip 13. A plate 16 with slots 17 is secured by screws 18 in adjusted position lengthwise of the lever strip 13. The plate 16 has a projection 19 the end of which lies above a collar 20 on the eccentric 14 and is encountered by a long ward 21 of a key 22 when the latter has been inserted into the collar 20 to engage slots 20A and is rotated clockwise to cause the eccentric to raise the upper edge 13A of the lever strip 13.

A peg 23 protruding from the face 9 and through a hole in a disc 24 of birefringent material resting against the face enables the disc to rest on the edge 13A of the strip 13, with its upper edge almost in contact with the strip 10 when the strip 13 has been lowered by counter-clockwise rotation of the eccentric 14. The face 9 and the strips 10, 13 thus form a recess at one side of the block 1 to receive the disc 24, with the disc capable of being freed from contact by the strip 10.

By rotation of the eccentric 14 to bring the upper edge 13A of the strip 13 parallel to the strip 10, the disc 24 is pressed by the strip 13 into contact with the strip 10, so that it can be loaded at the ends of a diameter parallel to the axis of the block 1. By appropriate choice of diameter and thickness for the disc 24, loading produces a fringe pattern of the kind shown by FIGURE 7, a count of the fringes enabling the amount of loading to be determined from the known characteristics of the material of the disc.

When a compressive load is applied to the plates 4, 5, the block 1 undergoes elastic compression, so that the strip 10 moves towards the lever strip 13. Therefore, if the disc 24 is in contact with both strips 10, 13, it is compressed across a diameter by the amount of approach of the strip 10 towards that edge 13A, which equals the compressive strain undergone by the block 1 over the effective length represented by the vertical distance between its upper end face 2 and the level of the axes of the pin and screw 11, 12 (the compressive strain of the metal strips 10, 14 being negligible compared with that of the nylon block 1.)

If, with the block 1 free from load, the eccentric 14 is rotated by the key 22 to cause the strip 13 to bring the disc just into contact with the strip 10, and the end of the projection 19 on the plate 16 is then brought into contact with the long ward 21 of the key, the plate 16 can be locked by the screws 22 to leave the projection 19 in this position. The precise raised position of the edge 13A of the strip 13 can therefore always be reproduced by birnging the ward 21 to the end of the projection 19. With the disc 24 in contact with the strip 10, the first application of load to the block 1 starts the production of a fringe pattern in the disc 24, the number of fringes increasing with increase of the load.

Although when the birefringent material of the disc 24 is viewed with linearly polarised light only, the fringe pattern set up relates to both strain dierctions (isoclinics) and also shear strains (isochromatics). However, if the viewing is effected with the aid of a quarter-wave plate also, the isoclinics are removed from the fringe pattern. To enable this pattern to appear as black lines from which load and/or change of dimension can be determined, viewing should also be effected with the aid of monochromatic light, by an appropriate source or filter.

The face of the disc 24 next to the block 1 has an internally reflecting surface. By application in front of the disc 24 of a plate 25 comprising a layer of linearly polarising material and a quarter-wave layer, together with a filter layer, fringe patterns are caused to appear in easily observable form. Whatever the compressive load on the block 1, a count of the number of fringes gives a direct measure of the load. Thus, dependent on the Young's modulus of the material of the block 1, the effective cross-sectional area of the block, the effective length of the block as above defined, and the material, diameter, and thickness of the disc 24; one fringe at the centre can be made equivalent to say 2000 lbs., when the appearance of four fringes at the centre would indicate a load of 8000 lbs.

To simplify the counting of the fringes, a masking cover 26 (FIGURE 8) may be applied over the position occupied by the plate 25, with an aperture 27 extending transversely from the centre towards one side. Five fringes 28 are shown in FIGURE 8, representing 10,000 lbs. in the instance given above. A second aperture 29 in the masking cover 26 lies near one starting point of the fringe pattern on the disc 24, and provides for easy detection of fringes corresponding to load increments of 1000 lbs. in the early formation of the fringe pattern.

If a gauge provided with a disc 24 capable of covering a load range of 10,000 lbs. has the projection 19 so positioned by adjustment of the plate 16 that compression of the disc 24 between the strips 10, 14 does not begin until the block 1 has undergone a strain produced by a load of 10,000 lbs., the disc 24 then serves to detect increments of loading in the range of 10,000 lbs. to 20,000 lbs.

The lever strip 14 need only be raised when it is desired to take a reading, when gradual turning of the key 22 enables each fringe to be counted as the fringe pattern builds up to its final form when the ward 21 has reached the projection 19. However, if the gauge is located in a position not readily accessible, the strip 14 may be left raised, so that the fringe pattern corresponding to any load attained (see for example the later description of FIGURE 6) is always visible, if only by the aid of a projected light beam and a telescopic viewing device.

If a compensating polariscope is used, as previously indicated, it is the isochromatic pattern that is being viewed; and, by rotation of the polarising plate, any existing fringe pattern can be compensated back to any point, from which any fraction of a fringe can be read on the instrument.

Reference has been made above to the "effective cross-sectional area" of the block 1. FIGURE 3 shows the block provided with a lengthwise hole 30, which continues through the plates 4, 5, so that the assembly can be placed on a member the tensile load in which is to be determined. The axis of the hole 30 is displaced away from the flat face 9 to equalise the load distribution on the annular cross-section as modified by the removal of material to provide the face 9. Such a member may be a rock-bolt 31 (FIGURE 6), which passes into a hole 32 drilled into material 33 to be supported and anchored in the depth of the hole (by means not shown) so that a supporting plate 34 can be drawn against the face of the material 33 by rotating a nut 35. With the device as previously described placed on the bolt 31 between the plate 34 and a washer 36 against which the nut 35 bears, tension applied to the bolt by rotating the nut produces a compressive load on the block 1, capable of being measured from the resultant number of fringes appearing in the disc 24. This is an instance where the gauge may have to be left in an inaccessible position, with the lever strip 13 kept raised for the continued production of a fringe pattern, observation of which may then have to be made from a distance, as referred to above.

It is generally desirable to keep the disc 24 enclosed against dust and damp. The plate 25 and the masking cover 26 are indicated in FIGURE 2 as carried by a cover 37, which serves this purpose.

FIGURE 9 shows a body of tubular form capable of being used in place of the more solid block 1 of nylon as described above. The tubular body 37 has end flanges 38 providing parallel faces at the ends of its bore, the flanges merging externally into the outer surface of a circumferential swelling 39 normal to the axis of the tube. From its merging from the end flanges 38, the swelling 39 has a wall of substantially uniform thickness, and thus acts as a bellows when the tubular body is subjected to compressed load applied to the flanges. Formed of material of high Young's modulus, e.g., high-tensile steel, the body 37 undergoes a strain appropriate to a particular disc 24 used in association with it in much the same manner as with the block 1, and the tubular character of the body 37 enables it to be used as a washer for measuring tensile load, similar to the block 1 in FIGURE 6.

Gauges according to the invention are of very simple, cheap, and easily reproducible, mechanical construction. Relatively moving parts mainly involve sliding, and pivots can be substantially avoided. No delicate springs are required, and the construction may therefore be robust, even capable of use where (with no more than protection for the birefringent element) the instrument may be subjected to explosive blasts. In such connection, the absence of electrical instruments and wiring is particularly favourable.

The operation of the instruments being based on a fundamental property of the birefringent material, which is not affected by extraneous influences, the readings can always be considered as absolute. The gauge readings are directly additive (or subtractive) through the full range, so that there is "zero-stability."

Operation of the instruments and determination or interpretation of the readings can be undertaken by relatively unskilled persons. Not only can the instruments be applied with little or no modification of the part or operation involving the measurement; their use does not introduce any hazard, and their possible failure should not lead to damage or injury.

Whereas the term "plate" has been used above to define the form of the birefringent material, it is also possible to use the material when shaped in three dimensions, e.g. with the faces through which the light enters and are reflected from the material, taper with respect to each other or are otherwise not parallel to each other.

What we claim is:
1. A load gauge comprising in combination a body of material with parallel end faces by which compressive load may be applied to the body to cause it to undergo substantially uniform compressive strain, there being located at the side of the body a recess with overhanging ends parallel to the end faces, and a plate of birefringent material in the recess, the plate having oppositely directed convex edge portions to contact the respective overhanging ends, for the conveyance to the plate of a compressive strain in dependence upon the compressive strain undergone by the body.

2. A load gauge as in claim 1, wherein the body is a solid block having an axial hole from one of the parallel end faces to the other.

3. A load gauge as in claim 1, wherein the body is a stiff tubular bellows of material of high Young's modulus.

4. A load gauge comprising a body of material with parallel end faces by which compressive load may be applied to cause the body to undergo substantially uniform compressive strain, a flat face being formed on the body normal to the end faces, and end plate overhanging one end of the flat face, a lever movably mounted against the flat face, the flat face together with the overhanging end plate and the lever together forming a recess, a plate of birefringent material to lie against the flat face, the plate having oppositely directed convex edge portions for engagement with the overhanging plate and the lever respectively, and means to move the lever to a reproducible position to convey to the plate a compressive strain dependent upon compressive strain undergone by the body.

5. A load gauge as in claim 4, comprising an adjustable stop for the lever for pre-adjustment to any desired reproducible position to which the lever may be moved.

6. A load gauge comprising in combination a body of such cross-sectional area in relation to its length as to result in substantially uniform compressive stress over that area on subjection of the body to a compressive load applied in the lengthwise direction of the body, the body being provided with two abutments extending laterally from it and each having a face directed towards a corresponding face of the other, thus forming a lateral recess, and a plate of birefringent material fitting the recess between the faces of the abutments, the plate having oppositely directed convex edge portions to make contact with the respective faces, for compressive strain arising in the body over an axial length at least equal to the distance between the points of contact of the abutment faces with the respective convex portions of the plate to be conveyed to the plate itself.

7. A load gauge as in claim 6, wherein one of the abutments is adjustable with respect to the other, for variation of the distance between the abutments in relation to the corresponding dimension of the plate from one convex edge portion to the other.

References Cited in the file of this patent
UNITED STATES PATENTS
2,014,688     Mabboux _____ Sept. 17, 1935
FOREIGN PATENTS
1,161,842     France _____ Mar. 31, 1958